United States Patent
Hoang et al.

(10) Patent No.: US 12,453,037 B2
(45) Date of Patent: Oct. 21, 2025

(54) METHOD AND SYSTEMS FOR PROVIDING DYNAMIC AIRFLOW IN A DEVICE CHASSIS

(71) Applicant: CyberPower PC, City of Industry, CA (US)

(72) Inventors: Nam Hoang, City of Industry, CA (US); Matthew Brechbuhler, Glendale, CA (US)

(73) Assignee: CyberPower PC, City of Industry, CA (US)

( * ) Notice: Subject to any disclaimer, the term of this patent is extended or adjusted under 35 U.S.C. 154(b) by 0 days.

(21) Appl. No.: 17/898,485

(22) Filed: Aug. 30, 2022

(65) Prior Publication Data

US 2024/0074092 A1 Feb. 29, 2024

(51) Int. Cl.
*H05K 7/00* (2006.01)
*H05K 7/20* (2006.01)

(52) U.S. Cl.
CPC ................................ *H05K 7/20145* (2013.01)

(58) Field of Classification Search
CPC ........... H05K 7/20836; H05K 7/20145; H05K 7/20181; H05K 7/20209; G06F 1/20; G06F 1/206
See application file for complete search history.

(56) References Cited

U.S. PATENT DOCUMENTS

| | | | | |
|---|---|---|---|---|
| 4,463,896 A | * | 8/1984 | Schaus | A62C 3/14 236/49.2 |
| 8,720,532 B2 | * | 5/2014 | Malone | F04D 25/166 361/695 |
| 8,922,033 B2 | | 12/2014 | Vallinayagam | |
| 9,718,329 B2 | | 8/2017 | Brinas | |
| 10,030,885 B1 | * | 7/2018 | Yu | F24F 11/79 |
| 10,076,948 B2 | | 9/2018 | Takai | |
| 10,681,843 B2 | * | 6/2020 | Paseman | G06F 1/206 |
| 10,955,159 B2 | * | 3/2021 | Karamanos | G05D 7/0635 |
| 2006/0202045 A1 | * | 9/2006 | Liu | H05K 7/20209 236/49.3 |
| 2008/0009237 A1 | * | 1/2008 | Wu | F24F 11/30 454/256 |
| 2016/0102884 A1 | | 4/2016 | Terai | |
| 2016/0227670 A1 | * | 8/2016 | Liu | H05K 7/20181 |
| 2019/0107296 A1 | * | 4/2019 | Clark | F24F 11/30 |
| 2020/0315068 A1 | * | 10/2020 | Chiang | G06F 1/20 |
| 2023/0064742 A1 | * | 3/2023 | Shimul | F16K 31/02 |

FOREIGN PATENT DOCUMENTS

JP  4842386 B2  12/2011

* cited by examiner

*Primary Examiner* — Imani N Hayman
*Assistant Examiner* — Rashen E Morrison
(74) *Attorney, Agent, or Firm* — Krishna Kalidindi

(57) ABSTRACT

Systems and methods are provided for adjusting air flow in an electronic device. There can be a computer chassis formed in a shape of one of a cube or a cuboid with plurality of panels, at least one panel that adjusts an air flow into an interior portion of the computer chassis for achieving a desired temperature. The computer chassis including: the at least one panel including a plurality of vents, wherein the vents are movable in real-time to allow a differing amount of air access to the interior portion of the computer chassis; and at least one servomotor connected to the plurality of vents, wherein the at least one servomotor is configured to move the plurality of vents in real-time through a plurality of positions between open and closed.

9 Claims, 14 Drawing Sheets

METHOD AND SYSTEMS FOR PROVIDING DYNAMIC AIRFLOW IN A DEVICE CHASSIS

TECHNICAL FIELD

Embodiments generally relate to electronic device chassis and, more particularly, to mechanisms and techniques for providing airflow in a chassis which contains electronics.

BACKGROUND

Personal computers and electronic devices have been proliferating greatly since, at least, the 1980s. Uses, sizes, amount of electronics, power requirements and other variables have been used as inputs in the design of such computers and electronic devices. One item that is generally common to such equipment, is the need for a housing. One issue that exists for such equipment, is the need for the housing to prevent dust and other contaminants from entering the interior where the electronic components reside, while also providing an appropriate operating environment for the housed electronics. While this can vary, based on, for example, power requirements, it is still true that the components need to be housed.

The chassis can be described as a housing or a case, and it functionally organizes, protects and supports operation of the components used in the personal computer. Various components can be included in or attached to the computer chassis. These components include, but are not limited to, fans, internal drives, cards/card slots, one or more fans, heat sink(s), motherboard, various processing units, memory and a power supply.

A typical chassis is illustrated in FIG. 1. The chassis 100 can include a back panel 102, a front panel 104, a top panel 106, a bottom panel 108 and two side panels 110, 112. Panels 102, 104, 106, 108, 110 and 112 can be connected to each other and in some chassis designs these various panels can created as a one or more pieces. The back panel includes a fan 114 and fixed air intake holes 116. Front panel 104 can include fixed air exhaust holes 118. Inside of the chassis there can be a motherboard 120 which can have a plurality of slots 122 for inserting various cards. Fixed air holes 116 and 118 are static in nature and therefore, lack a dynamic configuration for controlling air flow to maintain a desirable temperature inside the computer chassis 100.

Another issue associated with conventional computer chassis design is the aesthetics. In addition to the functionality, users desire a personal computer that is aesthetically pleasing. However, it is submitted that most computer chassis designs are not as pleasant to view as they could be.

Thus, there is a need to provide methods and systems that overcome the above-described drawbacks associated with electronic devices as described above.

SUMMARY

In accordance with an example embodiment, a computer chassis is disclosed. The chassis is formed in a shape of one of a cube or a cuboid with plurality of panels, at least one panel that adjusts an air flow into an interior portion of the computer chassis for achieving a desired temperature. The computer chassis comprises: the at least one panel including a plurality of vents, wherein the vents are movable in real-time to allow a differing amount of air access to the interior portion of the computer chassis; and at least one servomotor connected to the plurality of vents, wherein the at least one servomotor is configured to move the plurality of vents in real-time through a plurality of positions between open and closed.

In accordance with another example embodiment, a panel that is attachable to a computer chassis is disclosed. The panel comprises: a plurality of vents, wherein the vents are movable in real-time to allow a differing amount of air access to the interior portion of the computer chassis.

In accordance with a further example embodiment, a method for adjusting air flow into an interior portion of a computer chassis is disclosed. The method comprises: monitoring parameters in the interior portion of the chassis; and adjusting a degree of opening of vent panels along a front panel of the chassis based on monitored value of the at least one monitored parameter wherein a position of the of the vent panels is controlled by a servomotor.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
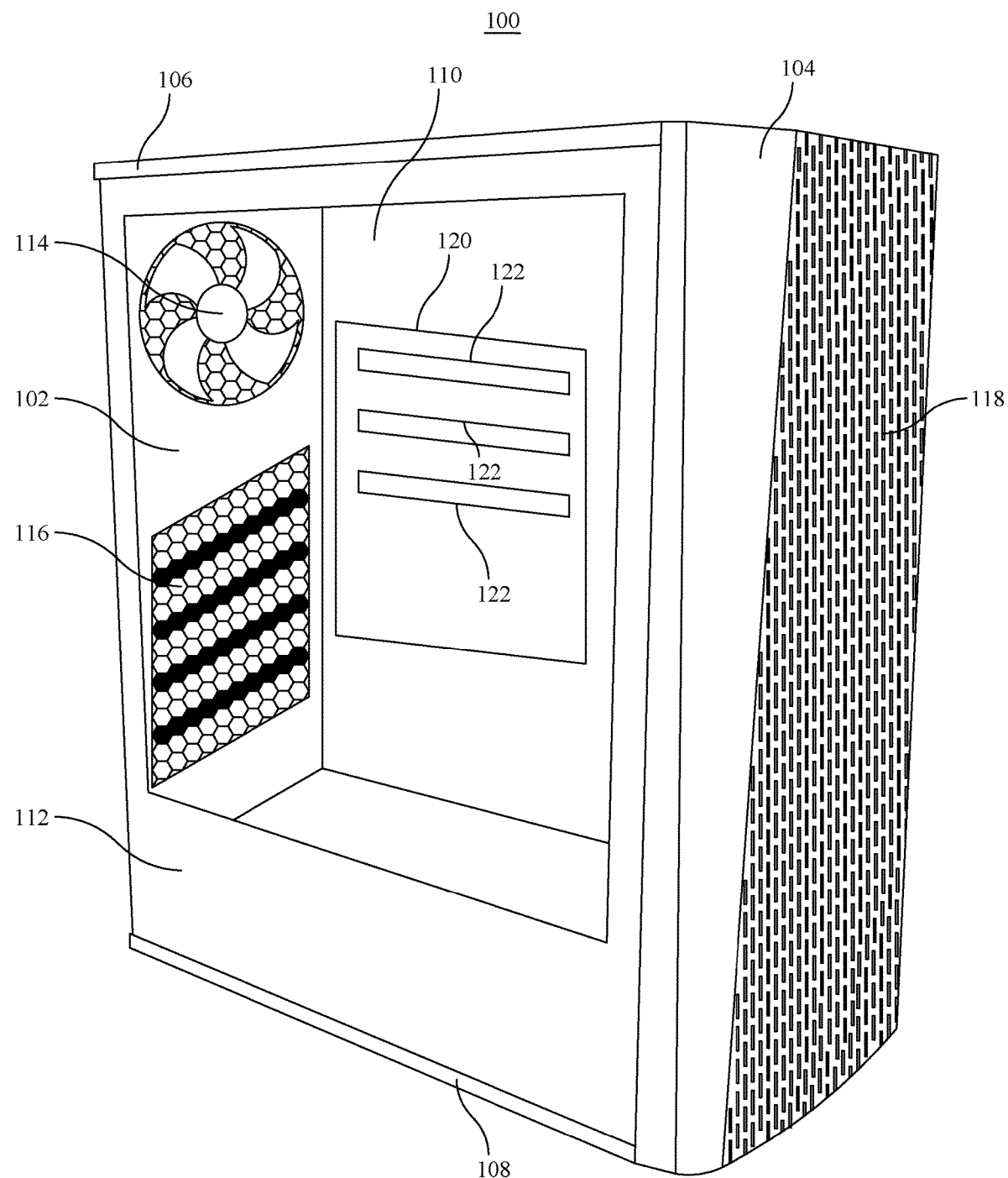
FIG. 1 illustrates a conventional computer chassis.

The embodiments are described more fully hereinafter with reference to the accompanying drawings, in which embodiments of the inventive concept are shown. In the drawings, the size and relative sizes of layers and regions may be exaggerated for clarity Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure or characteristic described in connection with an embodiment is included in at least one embodiment of the present disclosure. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As used herein, the singular forms "a", "an", and "the" are intended to include the plural forms as well, unless the context indicates otherwise. In the specification and the claims, the term "and/or" is intended to include any combination of the terms "and" and "or" for the purpose of its meaning and interpretation.

As highlighted above, there are drawbacks associated with the current designs of electronic devices, such as, computers and their associated chassis. For example, it may be useful to consider both functional elements and aesthetic elements when designing and building electronic devices. Embodiments described herein provide systems and methods for adjusting an air flow into an interior portion of the electronic device for achieving a desired temperature while using aesthetically pleasing implementations. While embodiments are described herein with respect to a computer chassis, it is to be understood that embodiments can be implemented in other electronic devices, e.g., other electronic devices which could benefit from air flow control, temperature control and/or aesthetic feature modifications.

According example embodiments, concepts associated with kinetic architecture can be applied to designs associated with objects which house electronic and/or electrical components, e.g., a computer chassis. Kinetic architecture is associated with designs for structures, such as, buildings, such that the structures can have dynamic motion in portions of the structure to support environmental concerns, aesthetics of the structure and other such concepts. According to an embodiment, these concepts can be applied to the design and manufacture of other objects, for example, housings for electronic and/or electrical components, but are not limited to just these objects.

Figure 2:
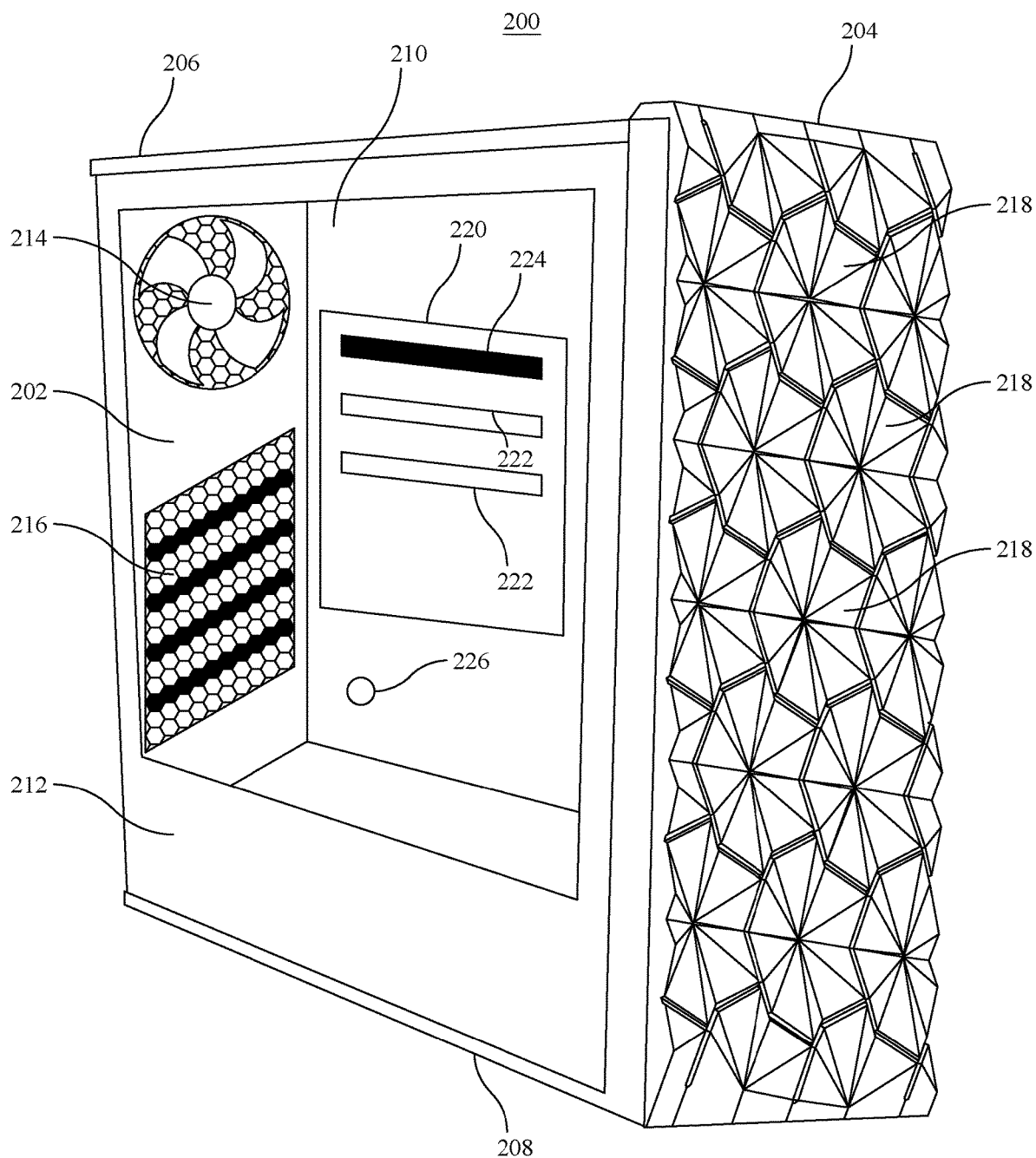
FIG. 2 illustrates a computer chassis according to an example embodiment.

A computer chassis 200 according to an example embodiment is illustrated in FIG. 2. The chassis 200, which is sometimes also referred to as a case, a housing, or a portion of such, can include a back panel 202, a front panel 204, a top panel 206, a bottom panel 208 and two side panels 210 and 212. Panels 202, 204, 206, 208, 210 and 212 can be connected to each other and/or in some chassis designs, they can be created as a one or more pieces prior to attachment. Back panel 202 can include a fan 214 and air intake slots 216. Front panel 204 can include one or more kinetic vent module(s) 218. Inside of the chassis there can be a motherboard 220 which can have a plurality of slots 222 for inserting various cards. Slot 224 represents a slot in which a card is present, e.g., a graphics processing unit (GPU). There may also be a temperature sensor 226 present either as a standalone temperature sensor or integrated into one or more cards, e.g., the GPU can include a temperature sensor.

While a single panel 204 which includes the one or more kinetic vent module(s) 218 is shown, it is to be understood that more than one panel can be a part of the chassis 200 or other panels can be manufactured to include the kinetic vent modules as desired. This can allow for a more dynamic control of both the intake and/or exhaust air flows. According to an embodiment, this dynamic control can occur in real-time or near real-time. The chassis and panel can be made from one or more of various materials, such as, acrylonitrile butadiene styrene (ABS) plastic, diecast aluminum and nylon.

Figure 3:
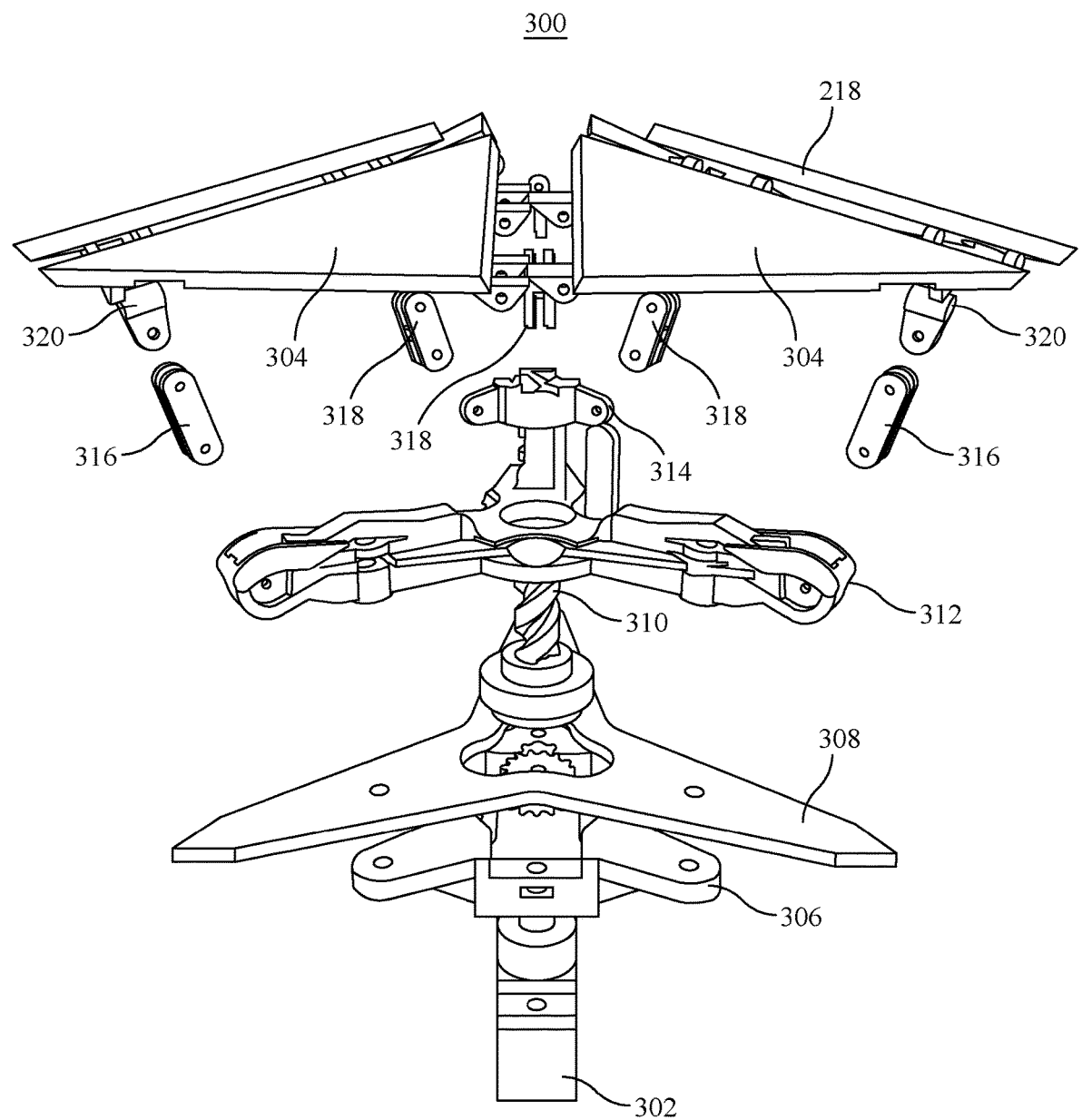
FIG. 3 illustrates an assembly according to an example embodiment.

An assembly 300 for use with panel 204 of FIG. 2 according to an example embodiment is illustrated in FIG. 3. At the base of the assembly 300, there is a servomotor 302 for driving the opening and closing of the kinetic vent module 218, which includes a plurality of vent panels 304. Servo mount 306 is connected to the servomotor 302 and to a mounting frame 308. The mounting frame 308 is connected to a mounting core 312 via a screw 310. Kinetic vent module 218 connects to the mounting core 312 via hinges 320 and arms 316, as well as other arms 318 which connect to a collar 314. This design allows for the servomotor 302 to rotate in both a clockwise and counterclockwise direction as well as the collar 314, mounting core 312 and screw 310 to open and close the kinetic vent module 218.

Figure 4:
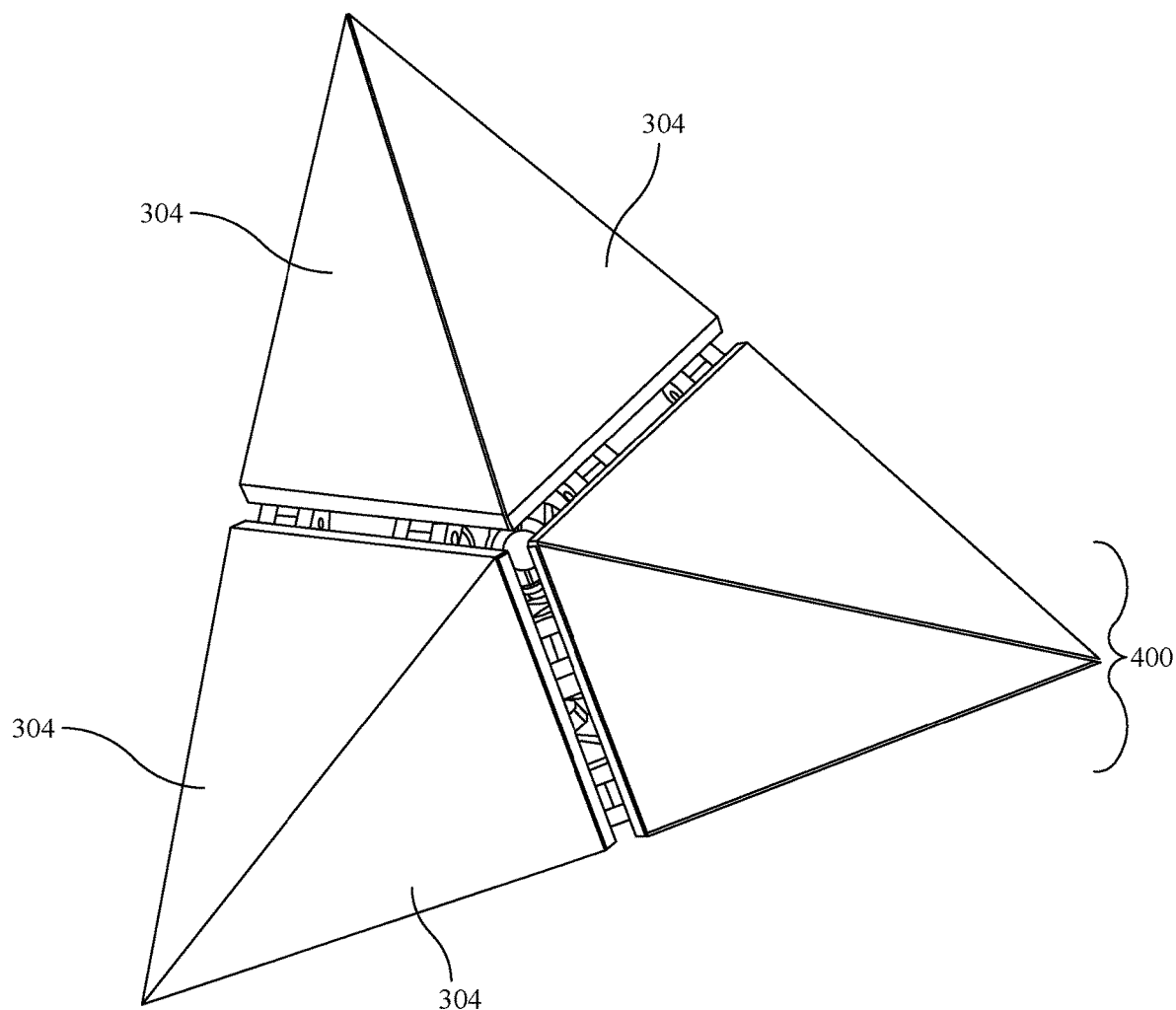
FIG. 4 illustrates a kinetic vent module according to an example embodiment.

A top down view of the kinetic vent module 218 according to an example embodiment is illustrated in FIG. 4. This view of the kinetic vent module 218 includes a plurality of vent panels 304 and grouping of two vent panels 304 which herein is called a vent panel pair 400. While a single shape/style of vent panels 304, vent panel pairs 400 and kinetic vent module 218 are shown here and in the other figures, it is to be understood that various shapes, sizes and configurations can be used as desired.

In example embodiments, various shapes and sizes can be used for the chassis 200, the front panel 204, the vent panels 304 and the kinetic vent modules 218. For example, smaller and larger dimensions can be used for the chassis to support other computer designs, as well as other electronic devices which could benefit from one or more of the aesthetics of the design and the real-time air control. Instead of triangular vent panels 304, and the grouping of three pairs of vent panels 400, square shapes, ovals, an iris or other polygonal shapes can be used which provide a same or similar functionality.

Figure 5:
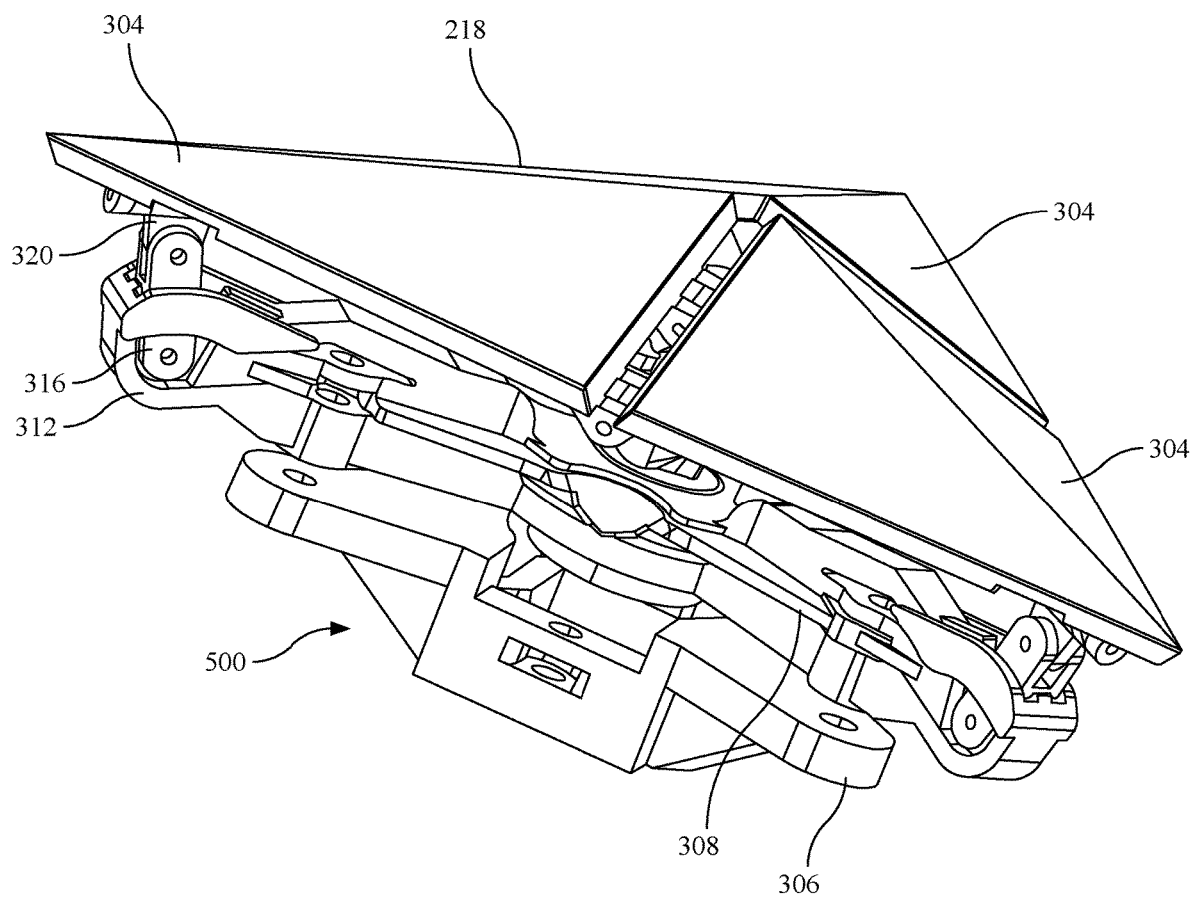
FIG. 5 illustrates another view of the assembly according to an example embodiment.

A different, side view of assembly 300 (compared to FIG. 3) without servomotor 302 according to an example embodiment is illustrated in FIG. 5. More specifically, FIG. 5 illustrates the kinetic vent module 218, a plurality of vent panels 304 and a core mechanism 500. The core mechanism 500 includes the servo mount 306, the mounting frame 308, the screw 310 (of FIG. 3), the mounting core 312, the collar 314 (of FIG. 3) and the arms 316, 318 (of FIG. 3).

Figure 6:
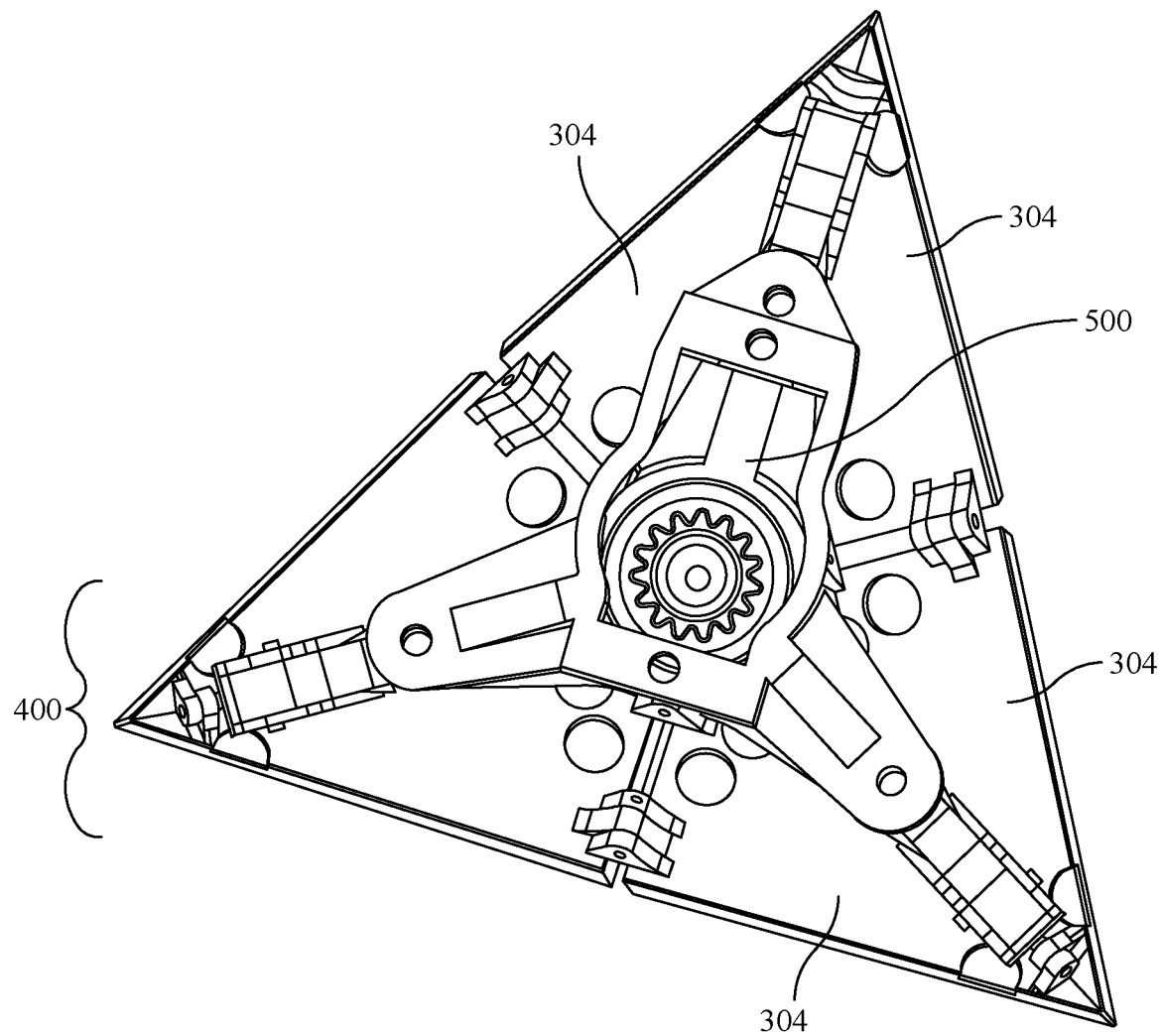
FIG. 6 illustrates a backside view of the kinetic vent module according to an example embodiment.

A back side view of the kinetic vent module 218 according to an example embodiment is illustrated in FIG. 6 which also shows the core mechanism 500, the vent panels 304 and a vent panel pair 400 from the back side.

There can be hard stops associated with the range of motion of the vent panels 304. The opening and closing hard stops can depend on the shape of the vent panels. For example, a triangular shaped vent panel could have a different hard stop then that of a square shaped vent panel which in turn could have a different hard stop then that of a vent panel which opens and closes like an iris.

The screw and collar design of FIG. 3 turns a screw 310 using the servomotor 302 with a range from 0 degrees to 270 degrees (0° to 270°). According to an embodiment using the vent panels 304, at 0 degrees (0°) the vent panel 304 is closed, and at 270 (270°) degrees the vent panel is in its most open position. The degrees described are in reference to rotation of a shaft ultimately physically connected to both the servomotor 302 and one or more kinetic vent module(s) 218.

Other operating ranges of rotation can be used in example embodiments. For example, a 360 degree (360°) servomotor could be used. Different rotational degree servomotors can be paired with various polygonal shaped vent panels to obtain varying ranges of hard stops generating various maximum and minimum opening sizes as desired.

Figure 7:
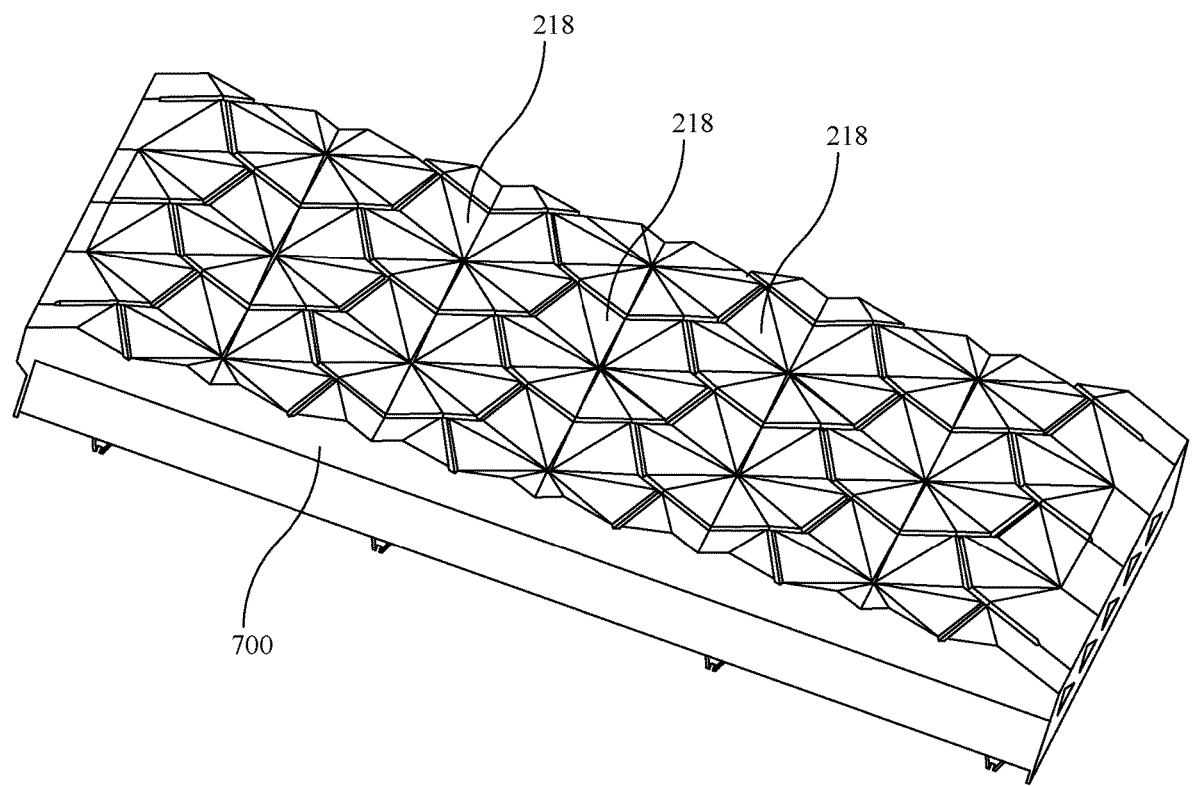
FIG. 7 illustrates a panel according to an example embodiment.

Panel 204 according to an example embodiment is illustrated by itself in FIG. 7. The panel can be its own separate entity or attached as a portion of the chassis 200 as shown in FIG. 2. The panel 204 includes a plurality of kinetic vent modules 218 surrounded by a frame 700. In an example embodiment, there can be eighteen kinetic vent modules 218 included with panel 204. In another example embodiment, there can be a range of kinetic vent modules 218 depending upon an operating environment that the electronic device is to be used in, e.g., 1-30 kinetic vent modules 218 as a part of the panel 204 or disposed elsewhere in a portion of a housing associated with a computer or other electronic device.

The chassis 200 and/or panel 204 can be used to control air flow in an electronic device to assist in obtaining and/or maintaining a desired temperature inside of the electronic device while also being aesthetically pleasing. Example embodiments can provide dynamic adjustment of the intake by expanding one or more of the kinetic vent modules 218. For example, the air intake can be adjusted to reduce the airflow by expanding (closing) the vent panels 304, which reduces the size of an opening between the interior and exterior of the chassis 200. The air intake can also be adjusted to increase the airflow by contracting (opening) vent panels 304.

The amount of expansion or contraction can be based on one or more parameters, e.g., air temperature inside the chassis, pressure inside the chassis, temperature of one or more components, number of dust particles within the chassis, etc.

According to another example embodiment, a kinetic vent module can include two cylindrical sheets with one or more shapes cut out of the cylindrical sheets. The cylindrical sheets may overlap each other, and one of the cylindrical sheets may be fixed to a computer chassis 200 with the other cylindrical sheet being configured to rotate. One cylindrical sheet may be disposed towards an interior portion of the computer chassis relative to a second cylindrical sheet. In the case when the cylindrical sheet disposed towards an interior portion of the computer chassis rotates, one or more openings associated with the cutouts on the rotating cylindrical sheet may overlap with each other to increase or reduce an airflow into or out of the computer chassis. According to another example embodiment, one or more camera irises that dilate could also be used in a similar manner for controlling air intake and/or air exhaust into the computer chassis.

Control logic can be defined by a user via software and be based on numerous variables, such as, different dynamic sources of temperature information or the via other user defined parameters. In an example embodiment, the temperature information can be derived from sensors inside or outside of the computer chassis 200. A temperature gradient could be determined from temperature sensors and used by the control logic. Other data such as humidity information, pressure readings, particulate count in the air (e.g. dust), and the like could also be used in conjunction with the temperature information or on its own. Inputs to the control logic can be dynamic inputs or static inputs as desired.

The operation of the servomotor 302 to open or close the vent panels 304 can be based on many different collected data that can then be computed in real-time. The operation of the servomotor 302 can be based on an internal ambient chassis temperature with other real-time metrics gathered from, for example, one or more independent temperature sensors or from onboard temperature sensors built onto components such as the motherboard. Alternatively, the operation can be based on individual components which have their own temperature sensors such as CPUs, GPUs or other components with their own built in temperature sensors. The operation can be controlled by analog means such as manually with a not or by fixed preset settings that assign different levels of opening/closing the vent panels 304 to one or more buttons.

In an example embodiment, when a measured temperature value is lower than a user defined, or an otherwise selected, temperature value, no airflow maybe needed to keep the interior air temperature within a safe operating range. In this case, as well as in others when temperature is not necessarily the overriding parameter, expanding (i.e. closing) the vent panels 304 will reduce the airflow while also decreasing the noise created by the fan as well as reducing the intake of dust and possibly other particles. When the sensed temperature reading is high, the increased airflow may be desired to keep the interior air temperature within a safe operating range so contracting (i.e. opening) the vent panels 304 will increase the airflow. In some cases, the vent panels 304 will close when the computer is in a low processing or sleep mode, but it will open when the computer is in a higher processing mode to maintain a stable, high performance among the various components.

The instructions and/or parameters/decision points can be based on internal and/or external operating conditions since the mechanism can base its movement on a data source not limited to temperature. For example, in humid regions where there is a fear of condensation damage, it could expand and contract to reduce airflow based on relative humidity inside or outside the chassis. In dusty areas it could be based on humidity as well or even specialized sensors that measure other environmental parameters.

Figure 8:
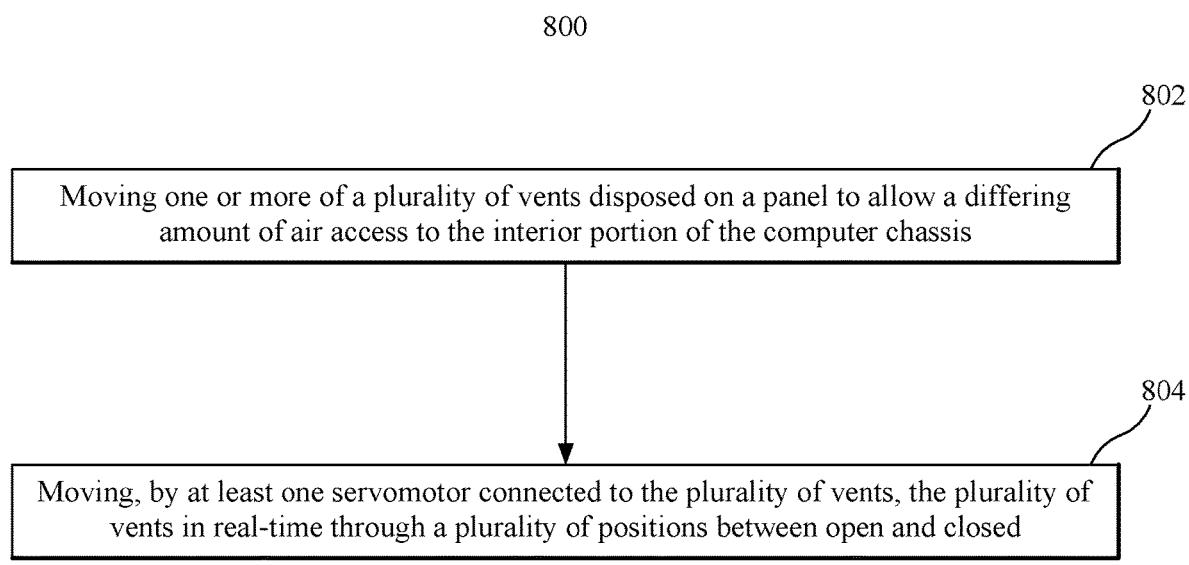
FIG. 8 illustrates a flowchart of a method for controlling air flow according to an example embodiment.

A method 800 for controlling air flow into an interior portion of the computer chassis for achieving a desired temperature according to example embodiments is illustrated in FIG. 8. The method includes: in step 802, moving one or more of a plurality of vents disposed on a panel to allow a differing amount of air access to the interior portion of the computer chassis; and in step 804, moving, by at least one servomotor connected to the plurality of vents, the plurality of vents in real-time through a plurality of positions between open and closed.

There are a variety of ways to provide the instructions used to control the motions of the vents. For example, the instructions can be included in a memory on a card in the computer or via customizable software setup by either the end user or a third party as desired.

The systems and methods described herein can also be applied to other devices and/or grouping of devices. For example, a plurality of movable vents, with the appropriate controls, can be applied to other electronic devices. This can include electronic devices for which temperature control and/or aesthetics are a consideration, e.g., laptops, servers, remotely deployed devices in warm environments and the like. It is to be understood that the vents and associated controls could be scaled to the device as needed. Additionally, according to an embodiment, in a location in which multiple computers are operating the panels as described herein could be applied to one or more of the various computers in the location with appropriate controls on more of a macro level to both assist in controlling each individual computer as well as the ambient temperature in the room by controlling the room temperature with a panel like device on a surface of the room.

Figure 9:
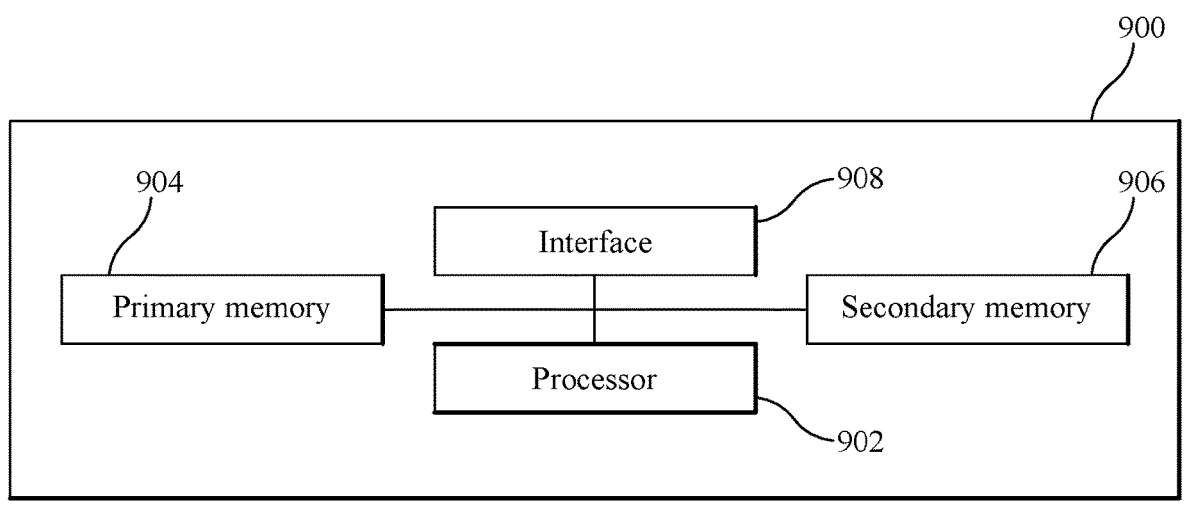
FIG. 9 illustrates a controller according to an example embodiment.

A controller 900 according to example embodiments is illustrated in FIG. 9. Controller 900 (which could be the card in slot 224 or another on the motherboard 210) can be used to execute instructions associated with operating the servomotor 302 for opening and closing the air panels associated with one or more of the kinetic vent modules 218. The controller 900 can include, for example, a processor 902, a primary memory 904, a secondary memory 908 and an interface 908. The interface 908 may be used for communicating with other portions of a computer, e.g., the servomotor 302, fan 214, and other components of an electronic device. Processor 902 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other components, such as memory 904 and/or 906. For example, processor 902 may execute instructions stored in memory 904 and/or 906.

Primary memory 904 and secondary memory 906 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 904 and secondary memory 906 may store any suitable instructions, data or information, including software and encoded logic, utilized by a computer and/or other electronic device. Primary memory 904 and secondary memory 906 may be used to store any calculations made by processor 902 and/or any data received via interface 908.

In an example embodiment, the panels can be contracted (opened) or expanded (closed) to the maximum extent based on measured parameter value(s) within the chassis. Using temperature as an example parameter, a threshold temperature parameter may be pre-defined by a user or by the manufacturer.

Assuming the panels are expanded (closed), if the temperature inside the chassis equals or exceeds the threshold, the panels can be opened to the maximum opening position in order to increase the air flow within the chassis. Conversely (assuming the panels are contracted (opened)), if the temperature inside the chassis falls below the threshold, the panels can be closed to restrict the air flow within the chassis.

Figure 10:
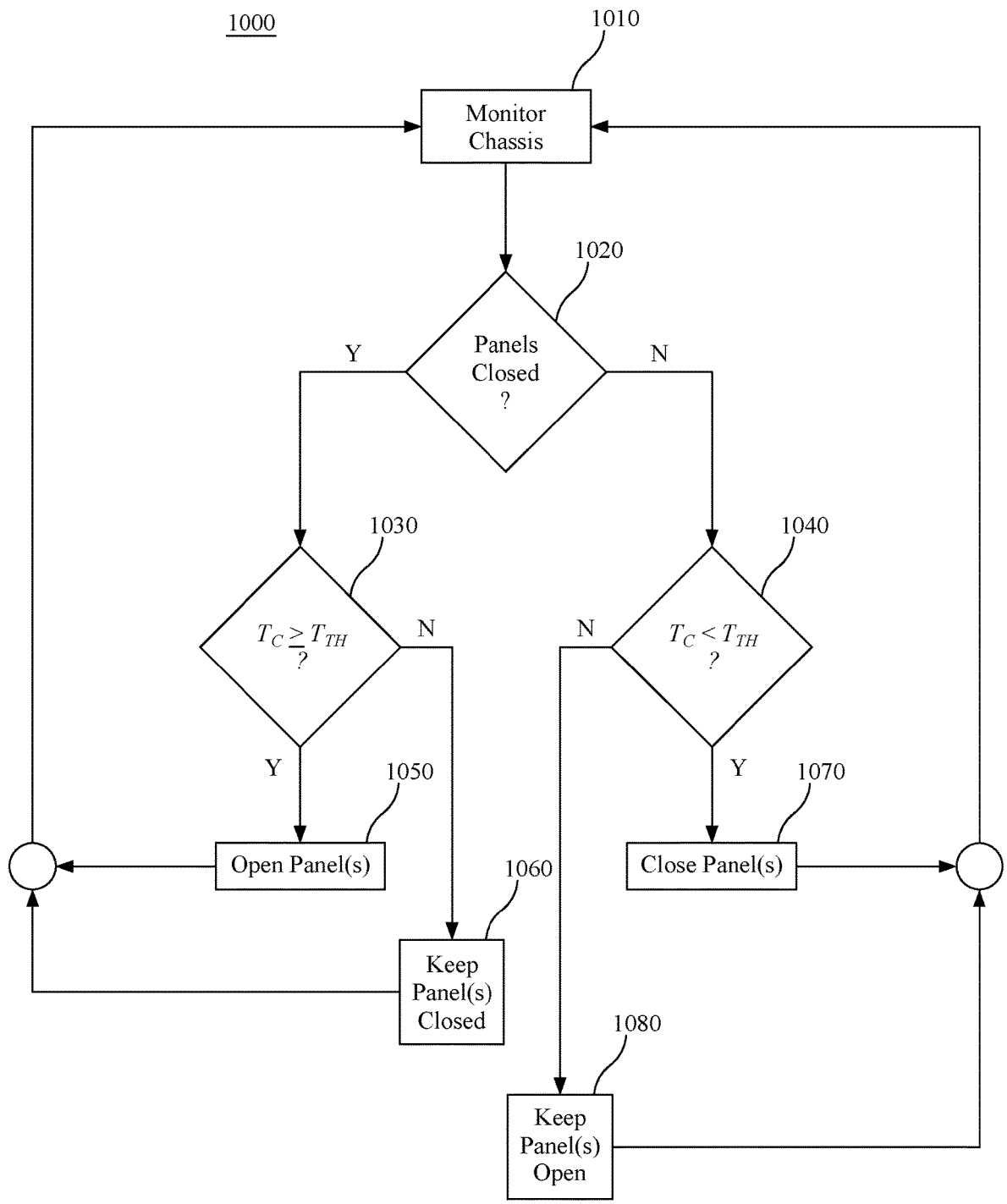
FIG. 10 illustrates a method according to an example embodiment.

A method 1000 in accordance with this example embodiment is illustrated in FIG. 10. A parameter of interest (such as temperature for example) in the interior portion of the chassis may be monitored at 1010. The vent panel position is determined at 1020. If the vent panels are closed, a parameter of the chassis interior is compared with a threshold for the parameter at 1030. If the parameter of the chassis ($T_C$) equals or exceeds (i.e. greater than or equal to) the threshold ($T_{TH}$), the vent panels may be opened at 1050 and the chassis continues to be monitored at 1010. If the parameter is below the threshold, the vent panels may remain closed at 1060 and the chassis continues to be monitored at 1010.

If the panels are not closed (i.e. open) as determined at 1020, a parameter of the interior portion of the chassis is compared with the threshold for the parameter at 1040. If the parameter of the chassis ($T_C$) is below (i.e. less than) the threshold ($T_{TH}$), the vent panels may be closed at 1070 and the chassis continues to be monitored at 1010. If the parameter of the chassis is not below the threshold, the vent panels may remain open at 1080 and the chassis continues to be monitored at 1010.

The degree of opening of the panels may be related to the position of the servomotor. The position of the servomotor (servo position) may therefore depend on the one or more monitored chassis parameters (e.g. temperature). As described above, the servomotor facilitates the opening or closing of the vent panels. The servo position may thus determine the vent panel position.

Figure 11:
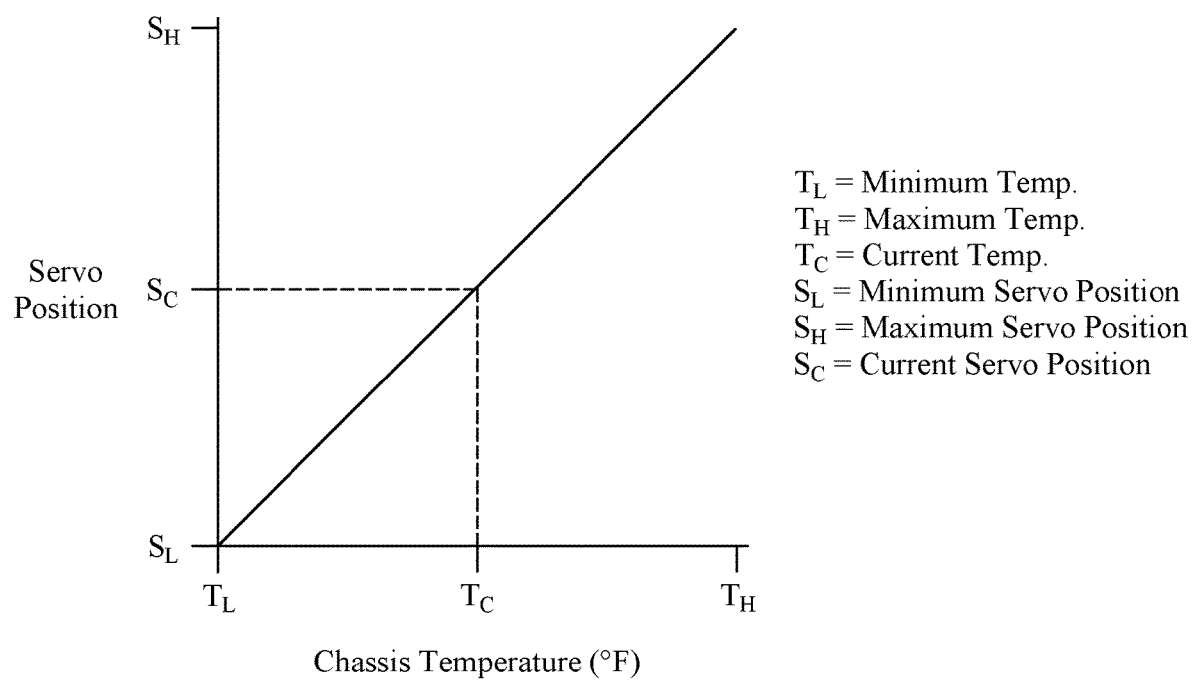
FIG. 11 illustrates servo positions as a function of chassis temperature according to an example embodiment.

The servo position as a function of the monitored temperature, depicted in graph 1100, according to an example embodiment is illustrated in FIG. 11. A minimum servo position ($S_L$) may correspond to a closed (expanded) position of the panels and be associated with a minimum (or low) temperature ($T_L$) of the chassis. A maximum servo position ($S_H$) may correspond to an open (contracted) position of the panels and be associated with a maximum (or high) temperature ($T_H$) of the chassis. A current position of the servo ($S_C$) as a function of the current chassis temperature ($T_C$) may be represented by the relationship:

$$S_C = [(T_C - T_L) * (S_H - S_L)] / [(T_H - T_L)]$$

Figure 12:
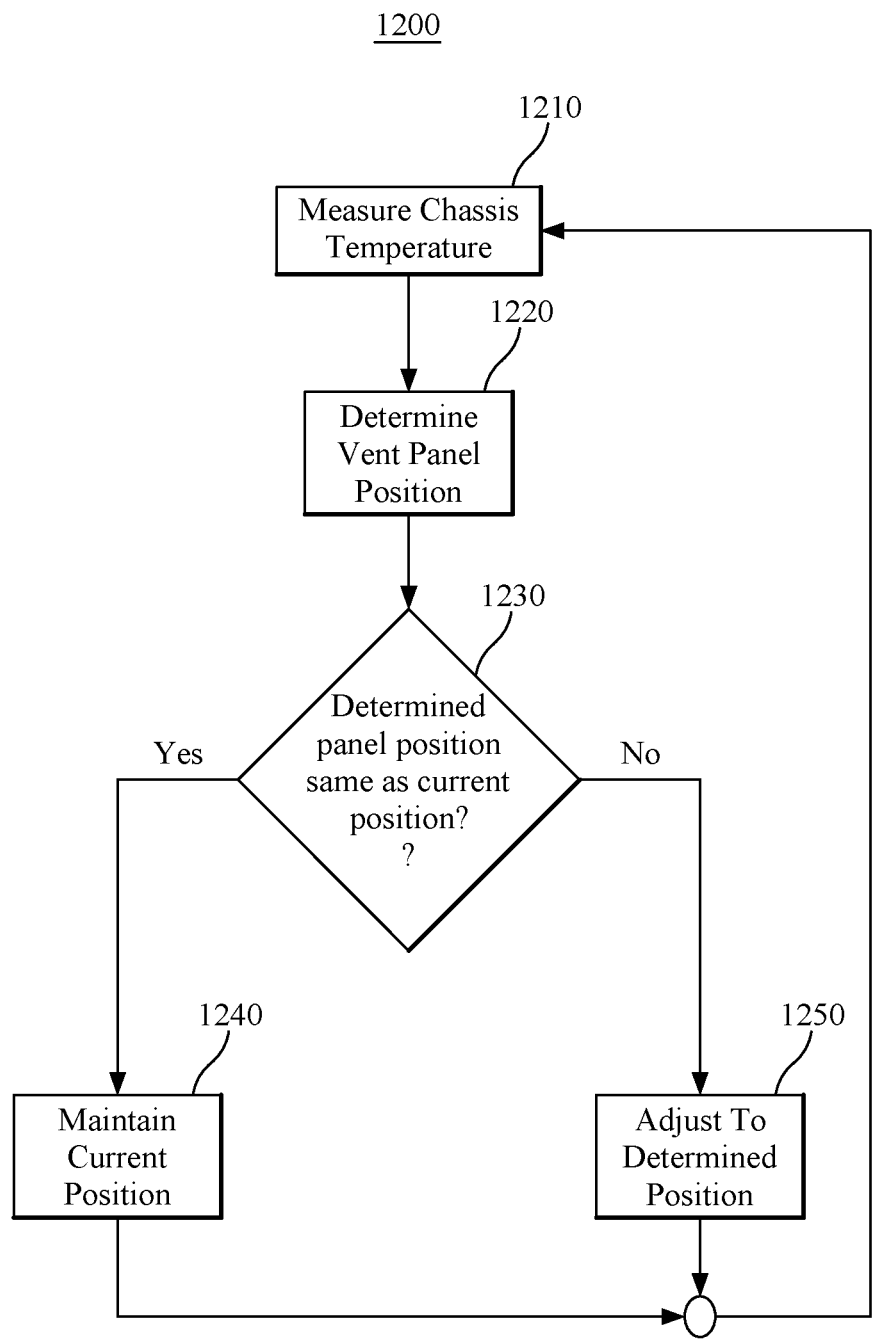
FIG. 12 illustrates a method for determining the servo position of FIG. 11.

A method 1200 of determining the servo position is illustrated in FIG. 12. The temperature within an interior portion of the chassis may be measured at 1210. The temperature may be measured at a predetermined frequency such as at one (1) minute intervals for example. The vent panel position (or % of opening) may be determined for the measured temperature at 1220. The determined panel position may be compared to the current panel position at 1230. If the current position is equal to the determined position, the current position may be maintained at 1240 and the chassis temperature may be measured at the predetermined interval at 1210. If the current position does not equal the determined position, the panel may be set to the determined position at 1250 and the chassis temperature may be measured at the predetermined interval at 1210. This process may be repeated for each of the plurality of vent panels along the front panel of the chassis.

Figure 13:
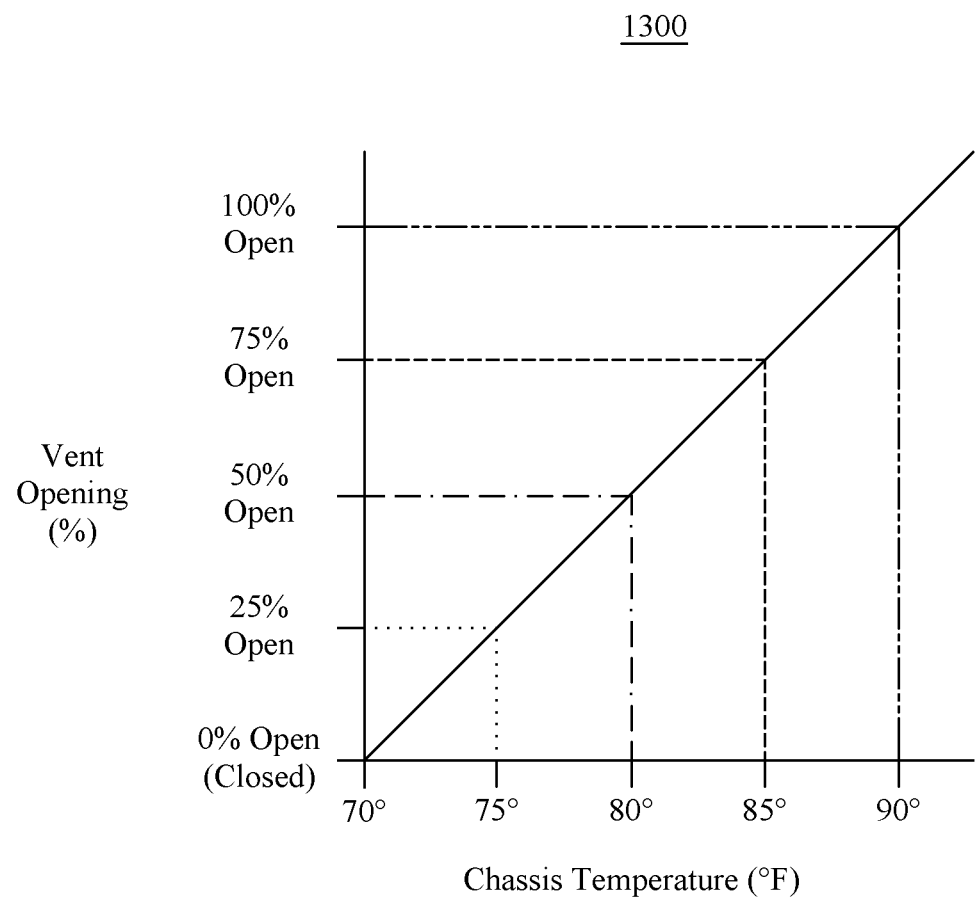
FIG. 13 illustrates vent positions as a function of chassis temperature according to an example embodiment.

In accordance with another example embodiment, a plurality of threshold values for each parameter may be pre-defined. Each of the plurality of threshold values may determine the degree of opening (or closing) of the panels. The percentage or degree of opening of the panels as a function of the temperature, depicted in graph 1300, is illustrated in FIG. 13.

The panels may be closed (0% open) when the temperature is 70° F. for example. The panels may be completely open (100% open) when the temperature is 90° F. for example. At 80° F., the vent panels can be 50% open. Other open percentages may include 25% open when the temperature is 75° F. and 75% open when the temperature is 85° F. for example. The percentage (or degree of) opening settings and the monitored temperatures highlighted are meant for illustrative purposes and are not intended to be restricted in any manner.

Figure 14:
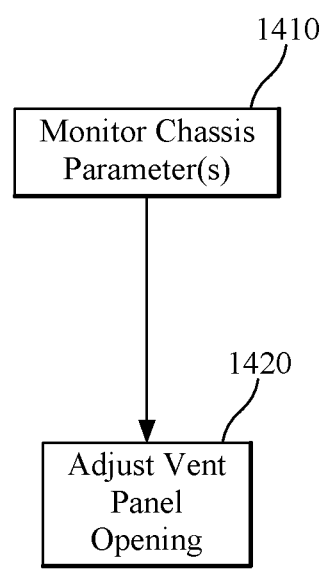
FIG. 14 illustrates a method according to an example embodiment.

A method 1400 in accordance with example embodiments may be described with reference to FIG. 14. The chassis temperature may be monitored at 1410. The panel opening may be adjusted based on the measured temperature at 1420. While temperature is used as an example with reference to monitoring the chassis, other parameters highlighted above may be used instead or in addition to the temperature.

In example embodiments, as described above, various electronic devices can include one or more panels and/or one or more kinetic vent modules in the various shapes, sizes and configurations described herein. The electronic devices include, but are not limited to, computers, phones, games controllers, televisions, television device interface units, and the like. For example, electronic devices which may benefit from controlling airflow based on environmental parameters which can affect the electronic device's performance may benefit form embodiments described herein. Further, it is to be understood that controls for groups of devices which have such kinetic vent modules could be controlled in groups to regulate airflow and/or temperature in an environment in which a plurality of electronic devices operate.

The disclosed embodiments provide methods and devices for adjust an air flow into an interior portion of an electronic device for achieving a desired temperature. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A computer chassis formed in one of a cube or a cuboid shape comprising: a plurality of panels wherein at least one of the plurality panels adjusts an air flow into an interior portion of the computer chassis; the at least one panel including a plurality of vent modules connected to a mounting core via hinges and first arms and to a collar via second arms, each vent module including a plurality of vent panels, the plurality of vent panels being movable in real-time to allow a differing amount of air access to the interior portion of the computer chassis, the vent modules having a substantially triangular shape with three dividable subsections including two triangular shaped panels; a screw connecting the mounting core to a mounting frame; a servo mount connecting the mounting frame to at least one servomotor; and at least one sensor for measuring one of an air temperature, an air pressure and a number of dust particles within the computer chassis, wherein: a rotation of the screw by the at least one servomotor moves the plurality of vent panels in real-time through a plurality of positions between an open position and a closed position, zero degrees (0°) of rotation of the screw corresponds to a closed position of the plurality of vent panels and two hundred and seventy degrees (270°) of rotation of the screw corresponds to a maximum open position of the plurality of vent modules, a hard stop is reached at the maximum open position resulting from the 270° of rotation by the screw, and an amount of opening of the plurality of vent panels is based on a difference between a determined first percentage opening value corresponding to a first time and a determined second percentage opening value corresponding to a second time subsequent to the first time, the determined first percentage value being based on the sensor measurement at the first time and the determined second percentage value being based on sensor measurement at the second time.

2. The computer chassis of claim 1, wherein a minimum servo position ($S_L$) is associated with the 0° of rotation of the screw, a maximum servo position ($S_H$) is associated with the 270° of rotation by the screw, a current servo position ($S_C$), associated with a current degree of rotation by the screw, is defined by:

$$S_C = [(T_C - T_L)*(S_H - S_L)]/(T_H - T_L), \text{ wherein}$$

$T_C$ is a current computer chassis temperature,
$T_L$ is a minimum computer chassis temperature, and
$T_H$ is a maximum computer chassis temperature.

3. The computer chassis of claim 1, wherein each subsection opens and closes in a same amount at a same time.

4. The computer chassis of claim 1, wherein each of the plurality of vent modules vents can be opened or closed at a different time.

5. The computer chassis of claim 1, wherein each of the plurality of vent modules vents can be opened or closed a different distance.

6. A computer chassis formed in one of a cube or a cuboid shape comprising: a plurality of panels wherein at least one of the plurality of panels adjusts an air flow into an interior portion of the computer chassis; the at least one panel including a plurality of vent modules connected to a mounting core via hinges and first arms and to a collar via second arms, each vent module including a plurality of vent panels, the plurality of vent panels being movable in real-time to allow a differing amount of air access to the interior portion of the computer chassis, the vent modules having a substantially triangular shape with three dividable subsections including two triangular shaped panels; a screw connecting the mounting core to a mounting frame; a servo mount connecting the mounting frame to at least one servomotor; and at least one sensor for measuring an air temperature, an air pressure and a number of dust particles within the computer chassis, wherein: rotation of the screw by the at least one servomotor moves the plurality of vent panels in real-time through a plurality of positions between an open position and a closed position, zero degrees (0°) of rotation of the screw corresponds to a closed position of the plurality of vent panels and two hundred and seventy degrees (270°) of rotation of the screw corresponds to a maximum open position of the plurality of vent modules, a change in an opening or closing amount of the plurality of vent panels is based on a difference between a determined first percentage opening value corresponding to a first time and a determined second percentage opening value corresponding to a second time subsequent to the first time, the determined first percentage value being based on the sensor measurement at the first time and the determined second percentage value being based on sensor measurement at the second time.

7. The computer chassis of claim 6, wherein the plurality of vent modules is are manufactured from at least one of plastic, die cast aluminum and nylon.

8. A computer chassis formed in one of a cube or a cuboid shape comprising: a plurality of panels wherein at least one of the plurality of panels adjusts an air flow into an interior portion of the computer chassis; the at least one panel including a plurality of vent modules connected to a mounting core via hinges and first arms and to a collar via second arms, each vent module including a plurality of vent panels, the plurality of vent panels being movable in real-time to allow a differing amount of air access to the interior portion of the computer chassis, the vent modules having a substantially triangular shape with three dividable subsections including two triangular shaped panels; a screw connecting the mounting core to a mounting frame; a servo mount connecting the mounting frame to at least one servomotor; and at least one sensor for measuring one of an air temperature, an air pressure and a number of dust particles within the computer chassis, wherein: a rotation of the screw by the at least one servomotor moves the plurality of vent panels in real-time through a plurality of positions ranging between an open position and a closed position, a degree of opening of each of the plurality of vent modules is defined by a circle with a circumference defined by a tip of each of the plurality of vent panels, zero degrees (0°) of rotation of the screw corresponds to a closed position of the plurality of vent panels and two hundred and seventy degrees (270°) of rotation of the screw corresponds to a maximum open position of the plurality of vent modules, a hard stop is reached at the maximum open position resulting from the 270° of rotation by the screw, and an amount of opening or closing of the vent panels is based on a determined percentage opening value between the open and closed positions, the determination based on the sensor measurement within the computer chassis.

9. The computer chassis of claim 8, wherein
a minimum servo position ($S_L$) is associated with the 0° of rotation of the screw,
a maximum servo position ($S_H$) is associated with the 270° of rotation by the screw,
a current servo position ($S_C$), associated with a current degree of rotation by the screw, is defined by:

$$S_C=[(T_C-T_L)*(S_H-S_L)]/(T_H-T_L), \text{ wherein}$$

$T_C$ is a current computer chassis temperature,
$T_L$ is a minimum computer chassis temperature, and
$T_H$ is a maximum computer chassis temperature.

* * * * *